United States Patent [19]

Ragle et al.

[11] 4,188,645

[45] Feb. 12, 1980

[54] PIEZOELECTRIC SERVO FOR DISK DRIVE

[75] Inventors: Herbert U. Ragle, Thousand Oaks; Dean DeMoss, Camarillo, both of Calif.

[73] Assignee: Burroughs Corporation, Detroit, Mich.

[21] Appl. No.: 957,169

[22] Filed: Nov. 2, 1978

[51] Int. Cl.² .............................................. G11B 21/02
[52] U.S. Cl. ................................. 360/75; 360/104; 360/109; 310/331
[58] Field of Search ..................... 360/75–78, 360/104–109, 110, 111–113; 310/331, 332

[56] References Cited

U.S. PATENT DOCUMENTS

| | | | |
|---|---|---|---|
| 2,842,685 | 7/1958 | Petermann et al. | 310/331 |
| 3,304,773 | 2/1967 | Rogallo | 310/331 |
| 3,526,726 | 9/1970 | Corbett et al. | 310/331 |
| 3,706,861 | 12/1972 | Giel | 360/75 X |
| 3,748,503 | 7/1973 | Cobarg et al. | 310/331 |
| 3,835,338 | 9/1974 | Martin | 310/331 |
| 3,924,268 | 12/1975 | McIntosh et al. | 360/77 |
| 3,936,882 | 2/1976 | Lane | 360/104 |
| 3,994,018 | 11/1976 | Kihara et al. | 360/105 |
| 4,080,636 | 3/1978 | Ravizza | 300/109 X |
| 4,091,428 | 5/1978 | Saito et al. | 360/104 |
| 4,106,065 | 8/1978 | Ravizza | 360/109 |

*Primary Examiner*—John H. Wolff
*Attorney, Agent, or Firm*—John J. McCormack; Nathan Cass; Kevin R. Peterson

[57] ABSTRACT

In a salient embodiment, an improved fine-positioning arrangement for mounting a recording transducer arm, comprising one or several pairs of "opposed" "piezo-flexures".

12 Claims, 11 Drawing Figures

PIEZOELECTRIC SERVO FOR DISK DRIVE

FIELD OF INVENTION

This invention relates to data storage devices useful in computers and the like; more particularly, it relates to such apparatus using a storage medium, like a magnetizable disk surface, and to associated magnetic transducers and improved means for translating these from one recording position to the next.

BACKGROUND, FEATURES OF INVENTION

Workers in the art of making and using data processing equipment are familiar with magnetic data storage arrangements wherein a transducer is positioned adjacent a moving magnetic recording surface. Such a transducer will record magnetic "bits" as data upon the surface and recover this information by passing the transducer adjacent a particular "recording track" along the surface, as workers well know.

This invention relates to apparatus for establishing and maintaining the position of such a transducer with respect to such recording tracks; it is particularly adapted for recording on magnetic tape, drum, and disk media, especially for high density, high TPI recording. In such recording, a fast, non-magnetic, miniaturized, solid state translation means is particularly desired—especially where translation distances are relatively small (on the order of a few dozen microinches or more—e.g., typically over a total excursion of a few mils).

Workers in the art of magnetic recording at ultrahigh densities are well aware of limitations in present-day transducer positioning apparatus, such as the typical voice coil actuator systems, or the like. Such systems are undesirably large, slow and unwieldly. They are particularly unsatisfactory for "centering" a transducer relative to a narrow recording track, where positioning is critical. Such systems are also troublesome in that they use solenoid magnets or other magnetic actuator means, creating stray magnetic fields that can interefere with the magnetic recording apparatus. The present invention is adapted to remedy these shortcomings with a solid state, piezo-electric flexure arrangement for mounting and positioning magnetic heads.

Thus, it is an object of this invention to provide improved solid state means for fine-positioning and centering a transducer relative to a magnetic recording surface. A related object is to provide such an arrangement for supporting and fine-positioning the transducer between closely adjacent recording tracks without need for any mechanical rolling, sliding or pivoting elements or other relative movement involving mechanical parts. Yet another object is to provide such a supporting/positioning solid state structure comprised of one or more electrostrictive elements adapted to be deformed (elongated and bent) in accordance with a control voltage applied thereto—preferably one or more pairs of bi-part "piezo-flexures", mounted in parallel and adapted to translate a supported head structure relatively rectilinearly.

BRIEF DESCRIPTION OF THE DRAWINGS

These and other features, objects and advantages of the present invention, will be better appreciated by workers as they become better understood through reference to the following detailed description of present preferred embodiments. This description should be considered in conjunction with the accompanying drawings wherein like reference symbols denote like elements:

FIG. 5 shows an enlarged elevation of a preferred "opposed" piezo-flexure mounting embodiment; while

DESCRIPTION OF PREFERRED EMBODIMENTS

Figure 1:
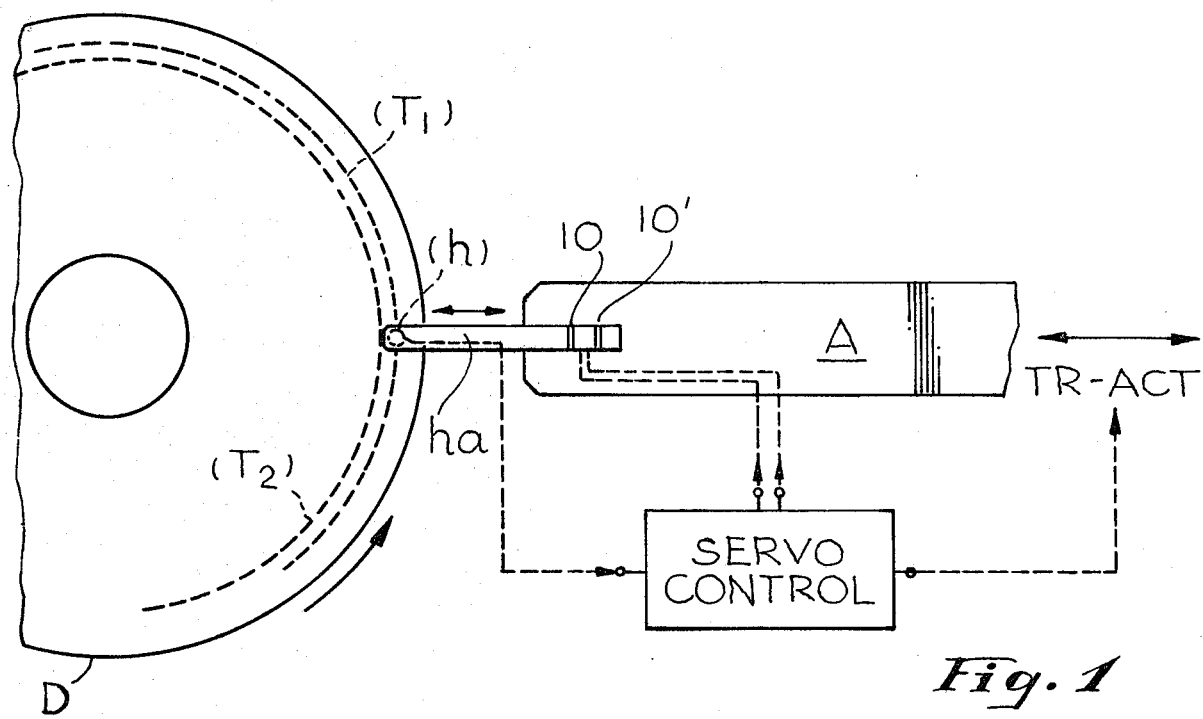
FIG. 1 is a schematic plan view of a recording head-arm, mounted for disk track-positioning on a piezo-flexure array according to a first embodiment; this being shown, enlarged, in the partial side elevation of FIG. 2 and further enlarged, in FIG. 3, with the flexure structure indicated in the greatly enlarged elevation of FIG. 4.

FIG. 1 will be understood as depicting, in very schematic plan view, a typical magnetic recording arrangement wherein a transducer, or head h, is adapted for "fine positioning" (i.e., track-centering, etc.) and like head positioning between closely adjacent recording tracks $T_1$, $T_2$, etc., according to one embodiment of the invention. Here, and elsewhere throughout this description, it will be understood that the construction materials and operation of known indicated elements will be conventional, except as otherwise indicated.

Thus, disk D will be understood as a rotatable magnetic disk of known construction, disposed, as indicated, operatively adjacent magnetic head h. Disk D includes a number of relatively concentric magnetic recording tracks, $T_1$, $T_2$. Preferably, such tracks should be understood as relatively closely spaced (e.g., on the order of one to twenty-five milli inch center to center), and preferably "abutting" in alternately-skewed "Herringbone" relationship, as known in the art, while being susceptible of "minute" centering translations (e.g., from one to a few mils).

Head h will be understood as suspended from the free end of a cantilever support, or head arm ha. Arm ha, in turn, is affixed at the free distal end of a "servo-arm" A, understood as reciprocated, rectilinearly as indicated by the arrow, by known means (e.g., a conventional voice coil, or lead screw arrangement as known in the art, and not indicated here) toward and away from disk D. This reciprocal motion can be controlled to conventional servo functions, translating head h between different tracks, or groups of tracks, on disk D (e.g., coarse positioning), responsive to servo signals as known in the art.

Figure 2:
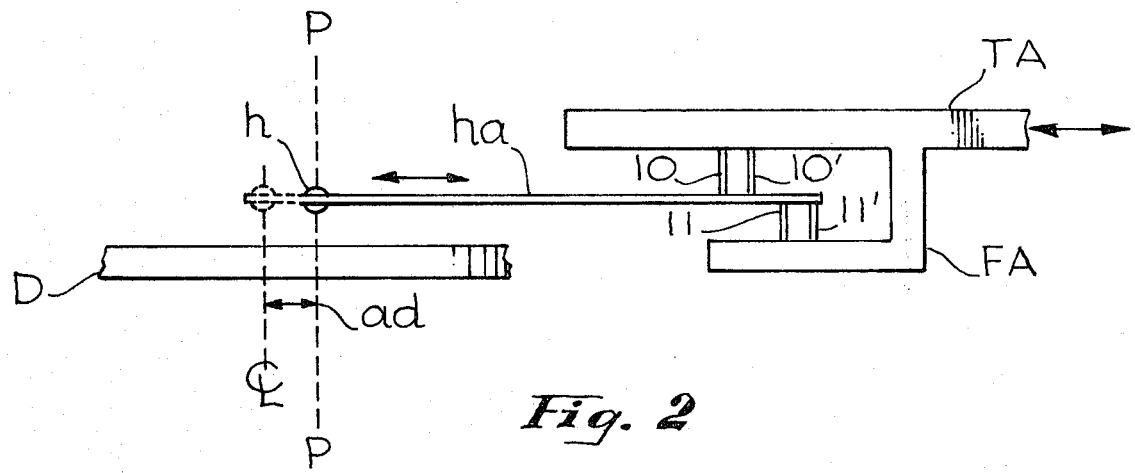
Figure 3:
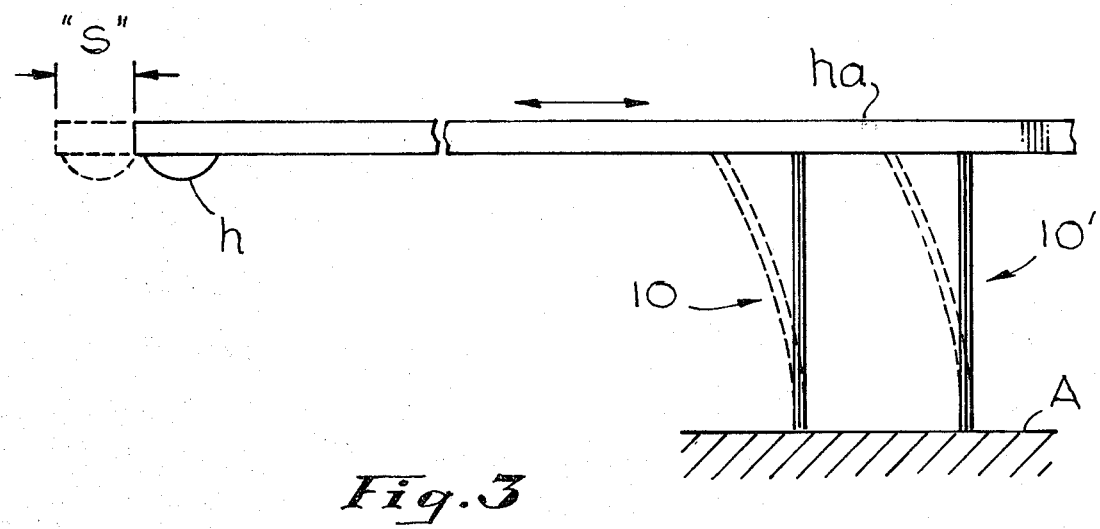

According to the invention, and as better indicated in FIG. 2, arm ha is suspended from servo mount A on a pair of "opposed" piezo-flexure arrays—each array comprising, preferably a pair of "piezo-flexure" supports, 10/10′ and 11/11′. Preferably, servo-arm TA is formed and adapted (e.g., with fork arm FA) to mount these flexure arrays above and below transducer arm ha as depicted in FIG. 2, making its excursion close to rectilinear and parallel to the recording surface on disk D [e.g., shift ad from P...P to track center ¢]. These supports are provided, and operated, according to the invention, to bend, as indicated in FIG. 3, upon being energized. Each flexure will be understood as an electro-strictive bi-part strip (see FIG. 4) constrained so as to bend a prescribed degree and translate arm ha and head h thereon, over a prescribed, relatively precise rectilinear excursion (see centering "ad" in FIG. 2 and excursion S in FIG. 3, here assumed to be the order of one to several dozen microinches, over a total excursion of one to several mils), responsive to application of prescribed electric voltage, as generally understood in the art.

Such an arrangement may, for instance, be adapted and controlled to automatically correct for track eccentricity, and other positional errors, establishing and maintaining a precise "track-centering" responsive to servo feedback (e.g., with centering signals fed-back from the media, as known in the art). Such control signals may, very conveniently, be applied as detailed below, to electrically activate these piezo-flexures and elongate and bend them for this purpose.

For instance, correcting signals may be derived from the data tracks themselves in a "track-on-data" mode, the servo-data being sensed by an associated control head and applied to "flexure control means" (not shown, but conventional), and processed there, so as to generate flexure activation signals. Such signals will be understood as adapted to produce a prescribed shift in head position, sufficient to effect the desired correction (by known associated electronic controls, not here detailed, but known in the art). Piezo-flexures 10/10', 11/11' will be understood as responding accordingly, being physically distorted to displace the head a corresponding prescribed straight-line distance in the direction of error reduction. Such a bending mode is electrically induced in flexures 10/10', 11/11' by forming the flexures of certain known piezo-electric materials adapted to suitably deform, and constraining them to bend as indicated.

Although a single piezo-flexure strip may be used in such an arrangement, it will be evident to those skilled in the art that, preferably, and as a feature of novelty, at least one pair of such like piezo-flexures will be used "opposedly", above and below arm ha, to induce a fairly rectilinear translation. Such "electro-strictive" materials are known to workers as adapted to elongate, or contract, in the desired direction, by a prescribed amount, when subjected to an associated electro-static field, being constrained so as to generate a bending excursion as indicated.

Of course, the transducer head may otherwise be constructed, and may be operated relatively conventionally—for instance, being gimble-mounted and arranged to pivot about either of two perpendicular axes, while also adapted to "fly" on an intermediate (e.g., relatively "stiff") air film above the passing medium, while being held or biased downwardly theretoward, as well known in the art. (Though such conventional elements are not indicated as shown here).

Preferred "Z-coupling" for "opposed" piezo-flexure support of head-arm

Figure 5:
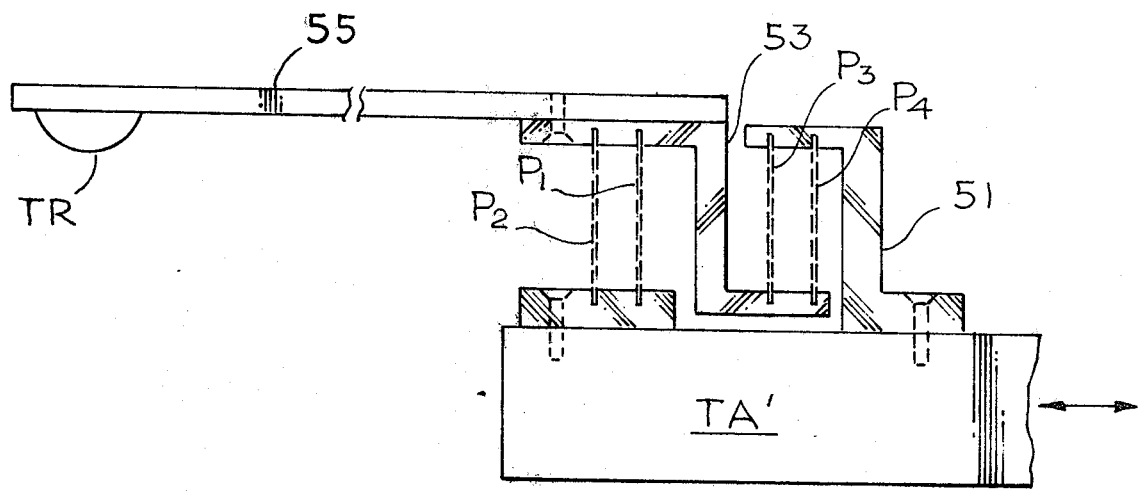

FIG. 5 indicates, in enlarged elevation (simplified for clarity) a more preferred technique for mounting a head-arm and head thereon (e.g., 55, TR) "opposed" (top/bottom) piezo-flexure arrays, on servo arm TA'. Thus, a "Z-coupling" mode is effected, using a "L-extension" 53 to engage one pair of "upper" piezo-flexure strips $P_3/P_4$ (coupled to arm TA' via Z-coupling 51, as workers understand); while "lower" piezo-flexure strips $P_1/P_2$ are coupled more directly to transducer arm 55. Workers will appreciate the advantages of such a coupling mode, e.g., is better compactness, reduced mass and simplicity of parts.

Construction of "piezo-flexure" strips

Figure 4:
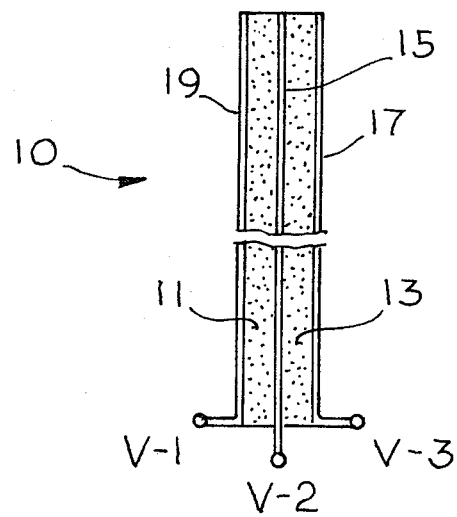

FIG. 4 indicates a preferred embodiment of such a piezo-flexure strip 10 (10', 11/11' are identical), wherein a pair of piezo-electric slabs, or "beams", are laminated together and bonded about an intermediate energizing plate, and being also sandwiched between a pair of energizing plates. Thus, application of a prescribed voltage across these plates (electrodes) will be understood as causing the beams to execute the indicated bending, pivoting excursion of prescribed magnitude. (FIG. 3, as illustrated in phantom, over rectilinear excursion S). As workers know, flexure depends upon the choice of piezo-electric materials and electric voltage (for a head load, etc., of prescribed mass), and the mounting. That is, application of a prescribed current may cause one of the beams to elongate and the other beam to compress, thereby developing the prescribed conjunctive pivoting excursion, since they are constrained by inter-bonding.

The preferred piezo-flexure strip will be understood as comprising a pair of "tandemly" coupled electrostrictive elements, 11, 13, each capable of deforming, and coupled to conjointly bend in response to associated control voltages applied across each. Preferably, slabs 11, 13 are alike, comprising a strip or thin slab of barium titanate ceramic (with electrical insulator material on the ends thereof, or else packaged in an insulated block, as above), with intermediate congruent conductor strip 15. The opposing faces of each strip may be rendered electrically conductive by application of a conductive coating (see 17, 19), such as by vacuum plating a metallic conductor directly thereon, or by affixing thin flexible metal backing strips, as known in the art. The ends of the backing strips, and of the intermediate strip, may be extended somewhat to form electrical connectors, as known in the art. [The piezo-deformation, and resultant bending excursion, of such could be analogized to the similar thermal deformation and conjoint bending of the bi-metallic strips in a thermostat].

More particularly, the first beam 11 and second beam 13 will be understood as formed of a suitable piezo-electric material such as barium titanate crystal, with intermediate electrode layer 15 and outer, flanking electrode layers 17, 19 (e.g., foil electrodes, as known in the art), with associated connectors to each, for application of respective voltages may be applied to induce this bending. These, electrodes, especially 15, must be very securely bonded to the beams. For instance, a prescribed voltage difference $\Delta V_a (= V_1 - V_2)$, may be applied across first beam 11 to elongate it, while a second voltage $\Delta V_b (= V_2 - V_3)$ is applied across the second beam 13 to compress it. The result is the indicated bending excursion indicated in FIG. 3 to the desired degree (i.e., desired bend-excursion and associated head translation distance S). The activation power must, of course, be controlled [e.g., not exceed breakdown voltage, or depolarize or rupture the crystal].

This motion of the laminated piezo beams must be constrained, as indicated, to induce such bending, that is, given the concurrent elongation/contraction of the bimorph crystals, they will be understood as bonded together (both to conductor 15) securely enough to maintain their contact with no relative movement under the prescribed elongation and bending moments—suitable, known adhesive being used to hold their faces joined to the intermediate electrode to provide this constraint. Such a piezo crystal laminate flexure may be characterized as having the two crystals in "opposed" electro-static relationship. As workers know, such strips are, typically, high voltage, high impedance devices. Care should be taken to provide against "creep" resulting from di-electric "relaxation" (e.g., a "set" can be avoided by assuring bi-directional bending in the usual operations).

It has been found, for instance, that a slab of barium titanate of certain kind, packaged in an insulative block, approximately ⅜ inches by ½ inch, and 0.1 inch thick will produce a displacement at one end of several mils (thousandths of an inch) with a control signal of several hundred volts is applied thereto (e.g., using a "Bimorph" piezo-flexure—Trade designation-designation as sold by Vernitron Piezoelectric Company, Bedford, Ohio, or a like unit sold by Gulton Industries, Fullerton, California). That is, ± several hundred volts across such slabs has been observed to produce excursions of ± one to ten mils, carrying a headload of approximately ten −200 grams, etc. Response in the "hundred Hz" range is feasible too.

The strips are arranged to flex about transverse and longitudinal axes with expansion and contraction of the edges (top only, the sides contracting or expanding, respectively). The bending about the transverse axis of the strip, results from the simultaneous, lengthwise expansion and contraction —of course, if the electro-static field is reversed, strip 11 will contract and strip 13 expand and the flexure 10 will bend in the reverse direction from that shown in FIG. 3. The total excursion of this piezo-flexure mount will thus be the sum of the positive and negative (left, right) bending excursions as associated control voltages are applied across the respective strips.

Intermediate electrode 15 and flanking electrodes 17, 19, are preferably quite thin and substantially coextensive with the (identical) faces of the crystal strips 11, 13, being adhered intimately therewith (e.g., using aluminum foil or the like—with an extending tab or wire for electrical connection). These strips will be understood as arranged to be energized in opposed electro-static relation so that one expands, while the other contracts, lengthwise; or vice-versa, according to the direction and polarity of the field impressed across each strip. The bending excursions and other associated dimensions are exaggerated for clarity of illustration in these Figures and the mutual constraint from the lamination of the crystals will, of course, result in greater mechanical bending motion.

As to materials, it is recognized that "alkaline earth titanates", such as barium titanate or mixtures of barium and strontium titanate, are suitable for formation of the piezo-electric strips 11, 13, or other like piezo-electric material, such as Rochelle salt, may be employed as workers will recognize.

Now, others have proposed like electro-strictive mounting means for other contexts. For example, in U.S. Pat. No. 4,080,636 to Ravizza a like (single) flexure strip is used, simply as a cantilever arm suspending a transducer above a reference surface and adjust its distance therefrom (but no rigid head kept a constant flying distance, as here; no piezo-flexure mounting for repositioning across the surface of the medium, etc.).

Pre-assembled array for opposed piezo-flexures

Figure 6:
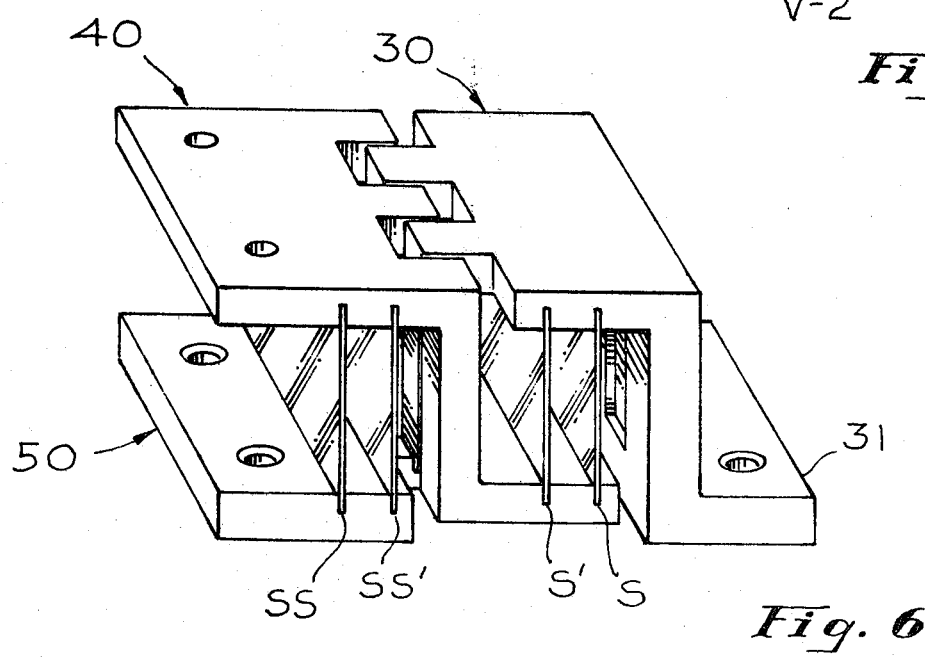
FIG. 6 shows a like view of a similar more preferred "pre-assembled" tri-part embodiment, with the parts separately shown in FIGS. 7-9.

FIG. 6 indicates, in upper elevation, a more preferred embodiment of the arrangement in FIG. 5 adapted for manufacturing and assembly convenience; e.g., being pre-assembled. Here, a Z-shaped movable member may be coupled via pairs of piezo-flexure strips to a pair of relatively stationary interconnected base members 50, 30. A first pair of piezo-flexure strips are to be firmly fixed and bonded in slots S, S′ of movable member 40 and in opposed registering slots in stationary Z-shaped member 30. Similarly, a second like set of piezo-flexure strips are bonded in slots SS, SS′ at the other end of member 40, extending to registering slots SS, SS′ in opposed flat stationary member 50. A unitary, pre-assembled opposed piezo-flexure coupling is thus produced; one allowing the stationary members to be fastened (e.g., by screws through the indicated holes) to a fixed support and the movable member 40 similarly fastened to the relatively movable load arm (transducer arm).

Figure 7:
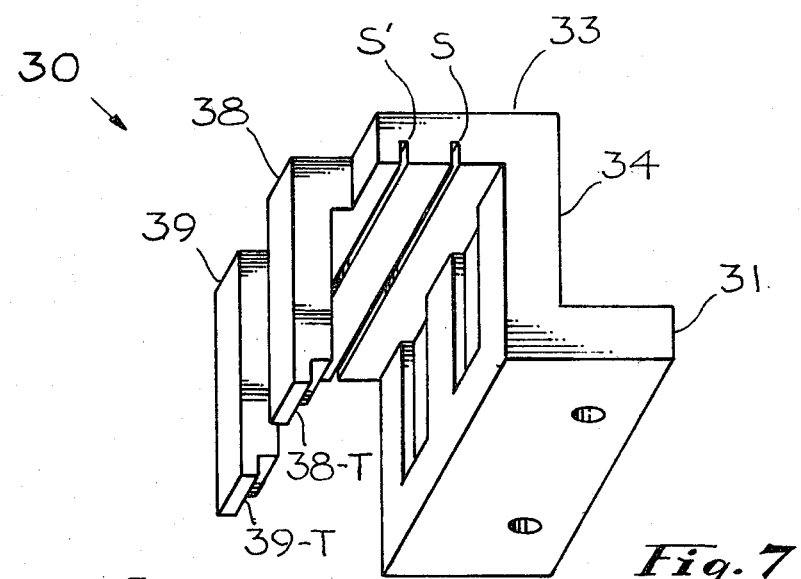

Z-shaped fixed member 30 is shown by itself in elevation in FIG. 7 as comprising a plate 33 in which "piezo-flexure-strip-receiving" like parallel slots S, S′ are cut, this plate mounted to be a prescribed distance from fastener plate 31 on a pillar 34. Member 30 also, preferably, includes one, or several, depending coupling strips, such as fingers 38, 39 adapted to couple member 30 relatively fixedly to companion stationary plate 50 and to thereby maintain a fixed relative position between these two fixed members in the pre-assembled array.

Figure 9:
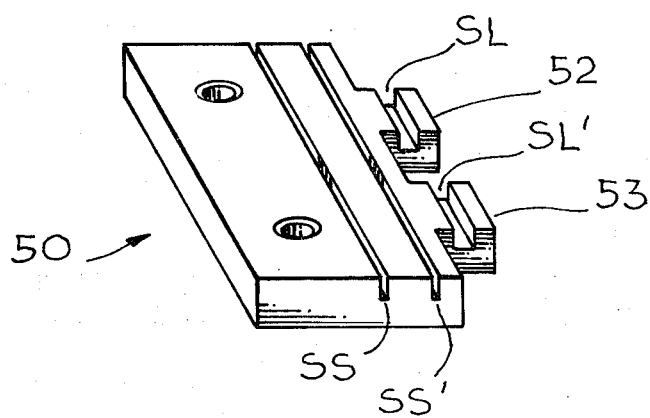

Thus, companion fixed member or plate 50 (FIG. 9) comprises a flat plate slotted at a pair of like parallel (piezo-flexure-strip-receiving) slots, SS, SS′ and preferably includes a pair of finger-receiving tabs 52, 53 adapted to be interconnected with fingers 38, 39 of companion member 30 (e.g., by receiving the tips 38-T, 39-T in a pair of slots SL, SL′ as known in the art).

Figure 8:
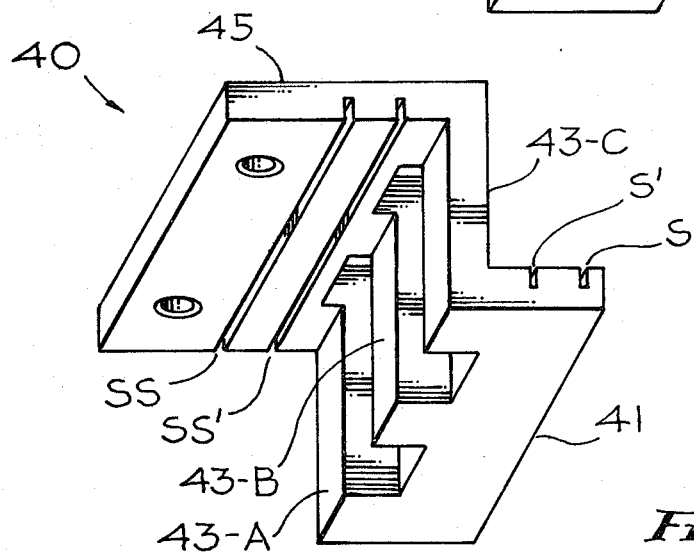

The movable member 40 is illustrated in lower elevation in FIG. 8 where it will be seen to comprise a pair of flat, relatively parallel plates 41, 45, each provided with respective like, parallel (piezo-flexure-strip-receiving-) slots S, S′ and SS, SS′, like those before-mentioned and spaced apart by pillars 43-A, 43-B, 43-C, pillars 43 are of a height approximately that of pillar 34 of member 30 and adapated to make the flexure strip-receiving slots of member 40 relatively coplanar with the slots of the adjacent fixed member (as also indicated in FIG. 6). Pillars 43 will be understood as spaced apart sufficiently to clear fingers 38, 39 and associated tabs 52, 53 mentioned above. Plate 45 is provided with a pair of bolt receiving holes so as to be attached to the movable arm (see transducer arm 55 in FIG. 5).

Such a pre-assembled opposed piezo-flexure array will be understood by workers to offer several desirable features such as manufacturing and assembly convenience as well as volumetric compactness yet relatively simple to manufacture.

Figure 10:
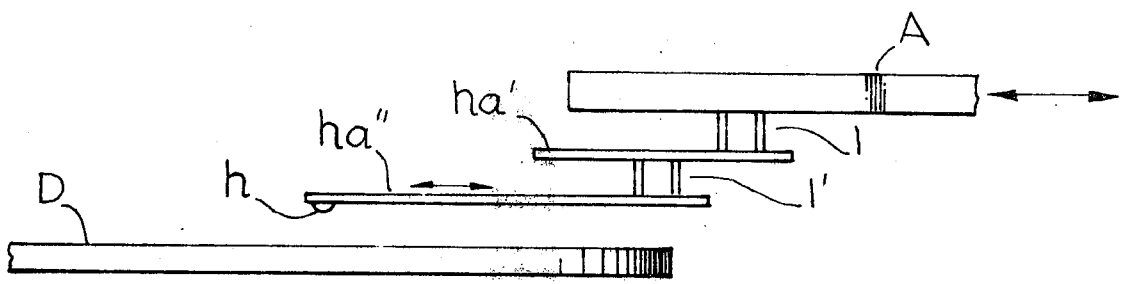
FIG. 10 shows a modified multi-arm embodiment in schematic side elevation after the manner of FIG. 2.

Alternate embodiment; FIG. 10

FIG. 10 illustrates an embodiment alternate to that described above, being generally similar thereto, except that the translatable load (see arm ha′) mounted on the first pair of piezo-flexures serves, in turn, as a support for a second, like pair of piezo-flexures on which the head arm ha″ is mounted. Workers will perceive that the end result will be a "compound" (cumulative) translation, of two serially-coupled loads, rather than translation of only a single load. This arrangement will be understood as constructed and operated the same as the foregoing embodiment except where otherwise mentioned.

More particularly, a first thrust arm ha' is mounted upon the conventional servo-arm A via a set 1 of bi-part piezo-flexure strips in the manner of the foregoing embodiment. However, arm ha' serves, in turn, as the mounting platform for a second similar arm ha" mounted on ha' via a second set 1' of piezo-flexure strips, essentially the same as the first pair 1. Arm ha" supports the transducer head h in operable, recording relation with the passing recording disk segment D, as before (as for arm ha in the prior embodiment).

As workers can visualize the total displacement of head h will be the sum of the individual displacements effected by the two pair of piezo-flexure strips 1, 1'. Of course, as workers can see, a further accumulation of intermediate translation arms, each mounted upon a like pair of piezo-flexure strips may also be provided, where practical—this to increase the total head translation distance. According to this feature of invention such an array of "ganged" piezo-flexure mounted arms may be employed with great versatility to tailor individual excursion steps, and the overall excursion range, within relatively wide limits, despite the miniscule translation steps accommodated by a single flexure-pair. And this affords the twin advantages of: "minimal excursion for minimum individual displacement", but with a relatively large "overall displacement range".

For instance, head h may be stepped by very modest increments, and very precisely and predictably, via a minimal energization of one flexure pair (e.g., strips 1, in FIG. 10)—then be further displaced by like minimal steps until the excursion limit of an individual unit (e.g., set 1) is reached—whereupon tandem pair 1' may next be energized to effect a further, similar series of displacement steps— and so on and so forth. [E.g., more such arms similarly piezo-flexure mounted successively on one another].

Alternatively, where one or several, relatively minimal translations are to be followed by a relatively large translation (as quickly as possible; and this to possibly be followed, in turn, by another series of "mini-steps"), then one or several flexure pairs may be "fully energized" simultaneously, to immediately flex through their respective full excursions, sufficient to effect this "giant step"—thereafter, one may revert to the "mini-steps" suited to minor energization of a single flexure pair. Workers will appreciate this and other examples of the versatility of such a "ganged array".

It will be understood that the preferred embodiments described herein are only exemplary, and that the invention is capable of many modifications and variations in construction, arrangement and use without departing from the spirit of the invention. However, workers will understand that preferred applications will be those, like the above, involving flexible media, where high-speed excursions up to a few mils (e.g., centering on a one-two mil track width) are involved.

Figure 11:
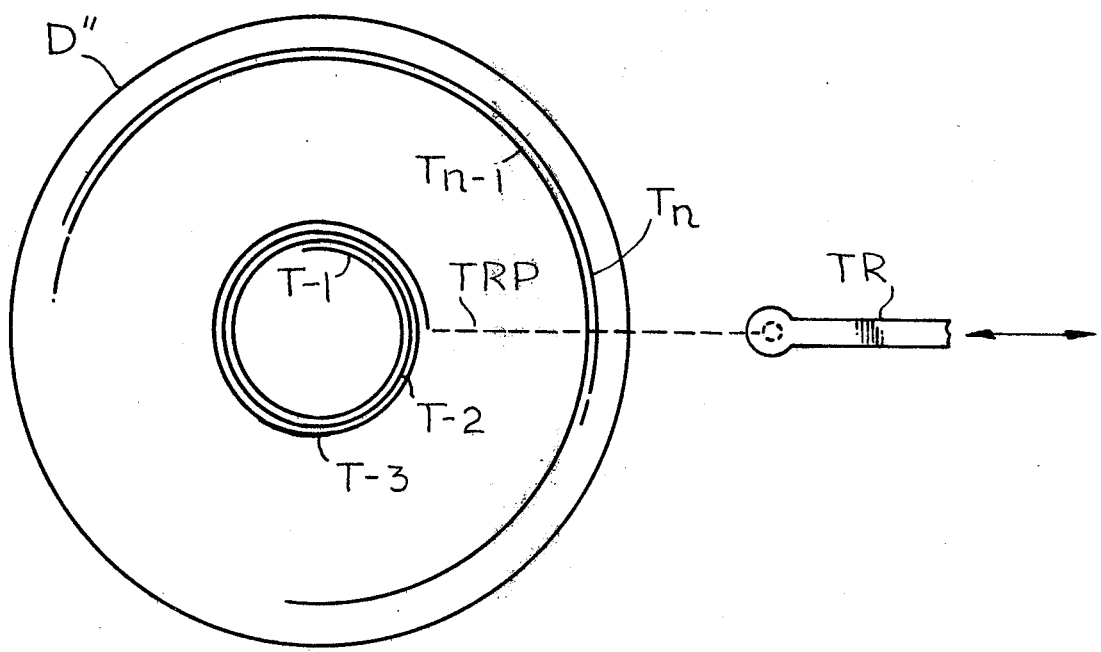
FIG. 11 is a plan view of a "spiral-track" disk after the fashion of FIG. 1.

"Spiral track" application; FIG. 11

Workers should also appreciate that this invention can have special advantages when used with other related magnetic records. One such record is a novel "spiral track" magnetic record wherein the transitions are aligned along one continuous spiral track T, extending from adjacent the disk center, gradually outward to adjacent the disk periphery. (E.g., as opposed to conventional magnetic disk records with concentric tracks such as indicated for disk D in FIG. 1). Such a record, disk D", is indicated, idealized and very simply, in FIG. 11. Thus, disk D" will be understood as having its magnetic bit transitions recorded along a single spiral track extending continuously from adjacent disk center (e.g., starting with "first" track revolution T-1, then T-2, etc.) and terminating adjacent the disk periphery (e.g., $T_{n-1}$, then $T_n$). Preferably the "pitch", or track separation is kept constant; partly for ease of track-location, radially, as indicated by transducer path TRP.

Now, as workers realize, such a spiral track is known for different, relatively gross media such as phonograph (disk) recordings (comprising undulations mechanically cut onto the disk surface as the disk is rotated and a recording head is advanced radially—e.g., with a "worn-gear" or other head actuator giving controlled rectilinear translation). But, workers in magnetic recording have not seen spiral recording yet emerge in practical form. This is partly because, with typical high track density, there has been no practical way to "follow" the relatively miniscule pitch for such a spiral (in R/W modes); also, possibly because no practical way is apparent for quickly "finding" any location ("data cell") along the spiral track.

These problems may be met, in part, by "track-on-data" technique for servo control and for instantaneously identifying any data-cell [e.g., as described in copending commonly-assigned U.S. application Ser. No. 807,155, filed June 16, 1977, by H. U. Ragle and N. S. Blessum, entitled "Improved "Track-On-Data" Technique and Associated System Involving Di-Bit Recording and Associated Di-Gap Transducers"; e.g., as opposed to requiring external means for this]. They are also resolved, in part, by application of a miniaturized, highly sensitive head-translation arrangement like the instant invention. For example, a disk head may be mounted on a pair of "opposed" piezo-flexure means like the above-described—any employing track-derived (locally-generated) signals to identify a data-cell and to keep the head "centered" on a selected segment of such a spiral track, as workers can appreciate. Workers will understand how such a head assembly can be positioned and controlled (e.g., via "track-on-data" servo feedback and control) to quickly center on a segment of spiral track T by moving across the disk radius (e.g., and quickly "snap-back" upon itself to re-read any circumferential-segment; e.g., doing so in about 2-3 u-sec., or typically about 1/10 disk revolution). This will compare most favorably with conventional means (e.g., big, bulky, high-power linear motors, taking several milliseconds between tracks).

Further modifications of the invention are also possible. For example, the means and methods disclosed herein are also applicable to tape systems and the like, as well as to drums, etc. Also, the present invention is applicable for providing the positioning required in other forms of recording and/or reproducing systems, such as those in which data is recorded and reproduced optically; and/or with other related head support/translation arrangements.

Of course, the invention will be perceived as capable for use with a wide variety of other tracking schemes (e.g., "tri-bit", "di-bit", amplitude modulated data). Also, while the described embodiments teach the use of "piezo flexures" coupled above and below a cantilevered head-arm, other mounting arrangements are likewise feasible [e.g., on either side of such an arm—though this could induce variation of gap azimuth unless the piezo-flexures were matched perfectly].

The above examples of possible variations of the present invention are merely illustrative. Accordingly, the present invention is to be considered as including all possible modifications and variations coming within the scope of the invention as defined by the appended claims.

What is claimed is:

1. In a recording transducer head supported upon a prescribed mounting arm and adapted for relatively linear translation and fine-positioning of the head by servo translation means across a locus of medium-confrontation, the combination therewith of:

multi-part piezo-flexure means arranged to mount this arm for such translation and adapted to provide one pair of bi-part piezo-flexure strips arrayed in line and coupled directly to said arm pivotingly, as a pair of restraining cantilevers for assuring such linear translation upon electrical energization, each said strip comprising a piezo-flexure beam comprised of a pair of piezo crystal slabs bonded together and affixed about an intermediate electrode segment which contacts the elongate spaces thereof, with a like flanking electrode plate bonded on the respective outer face of each slab, opposite said intermediate electrodes; so that, upon application of prescribed signal voltages and associated field between said segment and said plates, the beams will be electro-strictively energized and distorted and caused to conjunctively convert said electro-strictive distortion into a prescribed bending and somewhat linear translation of the arm to said translation means.

2. The combination as recited in claim 1, wherein said strips comprise like strips of barium-titanate piezo-electric crystal adapted to distort in "opposed electro-strictive" relation upon application of prescribed voltages across each strip.

3. The combination as recited in claim 1, wherein said piezo-flexure means comprises "opposed" piezo-flexure beams.

4. The combination as recited in claim 3, wherein said beams comprise one or more "upper" piezo-flexure strips engaged between one face of said head-carrier means and said servo arm to pivot the carrier means from above, and also one or more "lower" piezo-flexure strips engaged between the other face of said carrier means and said servo arm to pivot the carrier means from below.

5. The combination as recited in claim 4, wherein said carrier means includes a Z-shaped end-member adapted to engage said upper and lower strips at respective spread first and second plate portions; and wherein said servo arm includes first and second engagement means adapted to be disposed in strip-receiving registry opposite said respective first and second plate portions.

6. The combination as recited in claim 5, wherein said first engagement means comprises a flat plate and said second engagement means comprises a Z-shaped fitting with a strip-receiving plate adapted to be affixed in opposing registry with said second plate portion while being relatively coplanar with said first plate portion.

7. The combination as recited in claim 6, wherein the plate of said Z-shaped fitting is further provided with depending engagement means adapted to be engaged with said flat plate to maintain a prescribed diposition thereof relative to said Z-shaped fitting.

8. The combination as recited in claim 1, wherein said piezo-flexure means comprises a ganged array of piezo-flexure pairs, each pair supporting a respective translation of its respective arm.

9. The combination as recited in claim 1, as part of a magnetic recording/reproducing system including a magnetic head adapted to be positioned operatively adjacent a passing magnetic record medium, this head being carried on the distal end of a head-arm;

wherein said piezo-flexure means is adapted to couple this head arm adjacent its proximate end, with a prescribed servo platform;

the piezo-flexure means comprising two "opposed" pair of piezo-electric flexures mounted to support said head arm pivotingly on said servo platform, from above and from below, being engaged on opposite faces of the head arm, each said flexure comprising a pair of piezo-electric crystal strips disposed with their principle distortion-axes parallel and relatively normal to the plane of said medium, and adapted to be electro-strictively expanded/contracted in opposed relation, transverse these planes while bending, thereby to translate the head arm relatively rectilinearly along said plane; and means for generating, and applying to each said piezo electric-flexure strip, corrective control signals representative of the difference between the actual and desired position of said head relative to said passing medium.

10. A magnetic recording arrangement including a mounting servo arm, a transducer head adapted to be carried on a head-support which, in turn, is to be supported by said servo arm so as to be disposed in transducing relation and to be translated for fine-positioning of the head by servo translation means across a prescribed recording locus, this locus being operatively adjacent the plane of passing magnetic recording surfaces and relatively parallel thereto, for transducing interaction thereof with said head; the improvement therewith comprising:

a pair of opposed piezo-flexure means arranged and adapted to couple said support pivotably to said servo arm, both depending-ly and upstanding-ly;

each flexure means comprising a pair of like bi-part piezo-flexures arrayed in line and coupled directly to said arm pivotingly, as a pair of restraining cantelevers for assuring linear translation upon electrical energization, each said flexure comprising a pair of piezo-electric slabs bonded together about an intermediate electrode with a like flanking electrode plate bonded on their respective outer face of each slab, opposite said intermediate electrode; so that, upon application of prescribed signal voltages and associated field between said electrode and said plates, the flexures will be electro-strictively energized and distorted and caused to conjunctively convert said electro-strictive distortion into a prescribed bending and somewhat linear translation of the arm relative to said translation means.

11. The combination as recited in claim 10, wherein each said pair of slabs is bonded together and affixed so as to convert said electro-strictive distortion into said bending.

12. The combination as recited in claim 11, wherein each said flexure comprises a like slice of piezo-electric crystal, the two slices being bonded together about an intermediate electrode strip which contacts the elongate faces thereof; and wherein a like flanking electrode strip is bonded on the respective outer face of each slice opposite said intermediate electrode.

* * * * *

UNITED STATES PATENT AND TRADEMARK OFFICE
CERTIFICATE OF CORRECTION

PATENT NO. : 4,188,645

DATED : February 12, 1980

INVENTOR(S) : Herbert U. Ragle and Dean DeMoss

It is certified that error appears in the above-identified patent and that said Letters Patent is hereby corrected as shown below:

Column 5, line 14, "with" should read -- when --.

Column 6, line 43, "adapated" should read -- adapted --.

Column 9, line 63, "diposition" should read -- disposition --.

Signed and Sealed this

Second Day of August 1983

[SEAL]

Attest:

GERALD J. MOSSINGHOFF

Attesting Officer

Commissioner of Patents and Trademarks